July 16, 1963   K. M. TAYLOR   3,097,897
BEARING COMBINATION
Filed March 16, 1961

INVENTOR.
KENNETH M. TAYLOR
BY
ATTORNEY

United States Patent Office 3,097,897
Patented July 16, 1963

3,097,897
BEARING COMBINATION
Kenneth M. Taylor, Lewiston, N.Y., assignor to The Carborundum Company, Niagara Falls, N.Y., a corporation of Delaware
Filed Mar. 16, 1961, Ser. No. 96,304
9 Claims. (Cl. 308—193)

This invention relates to a bearing of the anti-friction type; and more particularly to a ball or roller bearing wherein the anti-friction elements are composed of a combination of high temperature refractory materials.

In many applications where rotating parts are subjected to intense and continued high temperature conditions of operation, the need for improved anti-friction bearings to avoid use and fatigue failures inherent in anti-friction bearings made of alloy steels is readily apparent. For example, in jet engines, rotor blades are turned at very high rates of speed under very high temperatures, and anti-friction bearings of the highest quality are required to permit such parts to turn freely and rapidly under such adverse conditions. Unless the bearings are adapted to use under conditions of high temperatures, cooling thereof is required, and other engineering complications are encountered. In arriving at a workable engine or mechanism design in this and other applications, such as missiles, high temperature industrial devices and the like, anti-friction bearings adapted to service under the severest conditions could be utilized if they were available.

Accordingly it is an important object of the present invention to provide anti-friction bearings of the ball or roller type, made of novel combinations of refractory materials.

Another object is to provide anti-friction bearings of the rolling contact type wherein novel combinations of refractory materials are utilized.

Another object is to provide novel anti-friction bearings which are adapted to use under temperature conditions wherein steel cannot be used.

A still further object is to provide anti-friction bearings of the ball and roller type wherein the anti-friction elements are composed of refractory materials of different but compatible types.

A still further object is to provide an anti-friction bearing of the rolling contact type wherein one of the elements is made of high density alumina and the other element is made of high density titanium carbide cermet.

Another object is to provide an anti-friction bearing of the rolling contact type wherein one of the elements is made of high density titanium carbide cermet and the other element is made of high density silicon carbide.

Figure 1:
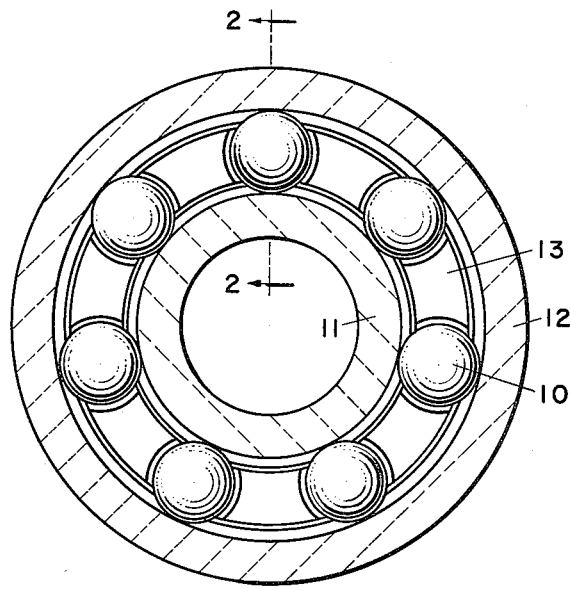
Figure 2:
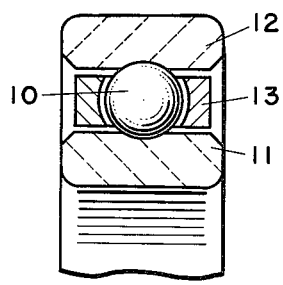

These and other objects will become more apparent from the specification taken in conjunction with the attached drawings wherein:

FIG. 1 is an elevation view in partial section of a bearing made in accordance with the invention; and FIG. 2 is a section view taken along the line 2—2 of FIG. 1.

As shown on the drawing, a bearing typifying the present invention utilizes a plurality of balls 10 running within an inner race-way 11 and an outer race-way 12. A spacer 13 distributes the balls uniformly around the circular orbit in which they travel. Although not shown the concept of the present invention is applicable to the production of roller bearings which are analogous to ball bearings except that straight or tapered rolls are employed within a suitable pair of inner and outer raceways; and such construction is to be included within the scope of the invention.

In accordance with the invention, one of the anti-friction elements is made of one refractory material and the other anti-friction element of another but compatible refractory material. For example, a particular combination which has been discovered includes the combination of dense, alumina as either the balls or race-way and dense titanium carbide cermet as the other component. Thus rolling contact between dense alumina and dense titanium carbide cermet is the bearing combination.

In accordance with an exemplary embodiment it is within the scope of the invention to form a ball bearing assembly wherein the balls are of dense alumina and the race-ways are of dense titanium carbide cermet. The opposite construction can also be used; thus the balls can be made of dense titanium carbide cermet and the race-way of dense alumina. Such combination is to be included within the scope of the disclosure, the inventive concept being an anti-friction bearing of the rolling contact type wherein one element is one kind of dense refractory and the other element is another but compatible kind of dense refractory.

Although the drawings illustrate the use of a bearing wherein the spacer element is employed, the present invention also encompasses a full complement bearing, that is one not utilizing a spacer ring or element. In the full complement bearing the race-way is fully loaded with balls or rollers as the case may be and these elements automatically space themselves around the circular orbit in which they travel.

In the production of bearings in accordance with the invention, where the balls are made of dense alumina, they are first hot pressed or sintered to spherical configuration and then ground and polished on ball grinding and polishing equipment to a very high surface finish. This enables the finished bearing to spin very freely without deterioration through pitting or the like.

Combinations of materials applicable to use in the invention include two; these are (1) dense titanium carbide cermet in combination with dense alumina and (2) dense titanium carbide cermet in combination with dense silicon carbide.

As regards the various components which can be used, it is to be noted that all are of at least 95% theoretical density and preferably a density of about 99% of theoretical will be employed. This high density is utilized to provide elements which are substantially free of porosity and have high strength.

Bearings of the invention are preferably utilized with lubricants and such include powdered lubricants typified by molybdenum disulfide and phthalocyanine. Phthalocyanine is a laminar crystalline organic compound of the formula $C_{32}H_{18}N_8$. Both materials possess the unique property of displaying stability to very high temperatures.

Bearings of the invention are adapted to use at very high speeds and at high temperatures. Speeds in the range of 4000 to 10,000 r.p.m. are common. However, the present invention is not to be limited by this range of rotation. Bearings of the invention are adapted to operate continuously in the temperature range from about 1000° F. to about 1500° F. which is substantially above the upper limit at which alloy steel bearings of the same type of construction can operate. In some instances it is to be considered within the scope of the invention to operate the bearings of the invention at least for short periods at temperatures as high as 1800° F.

Spacer rings adapted to use in the invention are of two types, depending upon the temperature of operation. Where temperatures not exceeding around 1000° F. are to be encountered, spacer rings of high temperature resistant alloy steel can be utilized. A molybdenum-titanium alloy consisting of 99.5% by weight of molybdenum and 0.5% by weight of titanium may be employed for the 1000–1800° F. range.

The various components of bearings of the invention can be made in a number of ways. However, elements of alumina including either race-ways or rotating elements are preferably hot pressed to provide a desired high density and low porosity. They are then surface finished by suitable grinding and lapping means such as diamond grinding and polishing machinery.

Fabrication of elements of the titanium carbide cermet are suitably made either by sintering or by hot pressing. The dense silicon carbide is preferably made by hot pressing but can be made by any process capable of producing the dense product. This could include the reaction sintering in silicon vapors of a body composed of silicon carbide and carbon, as described in U.S. Patent No. 2,938,807, dated May 31, 1960.

The following examples illustrate the production of bearings in accordance with the specific embodiments of the invention.

*Example I*

Substantially pure alumina of an average particle size of 1 to 5 microns was hot pressed at approximately 1700° C. and 2000 p.s.i. to spherical shapes of about 0.4 inch diameter. The spheres were then ground and polished on ball grinding and polishing equipment to a surface finish of 1 microinch, R.M.S., and spherical within 0.000025 inch. The balls of the set were uniform in size to ±0.0001 inch. Races of titanium carbide cermet [1] were made to substantially 99% theoretical density and consequently were substantially non-porous. These were then ground with diamond to a high surface smoothness of about 1–3 microinches, R.M.S.

Maximum deviation of groove surface from true radius was about 10 microns. Oscillation of the inner race groove was about 53% and of the outer race groove was about 56%.

Bearings made according to the above procedure were tested under different conditions and with different lubricants as follows:

|  | Run A | Run B | Run C |
|---|---|---|---|
| Temperature, °F | 1,000 | 1,000 | 1,500. |
| Rotation speed, r.p.m. | 5,300 | 5,300 | 8,000. |
| Thrust load, lbs | 175 | 175 | 50. |
| Duration of test, hrs | 28 | 11 | 8. |
| Lubricant | | Phthalocyanine | Molybdenum disulfide. |
| Wear | | Considerable | Moderate | Molybdenum disulfide. Negligible. |

The above results show that even under very severe use conditions of very high temperatures and high rotating speeds, bearings made in accordance with the present invention perform extremely well. In run C with a temperature of 1500° F. and a rotation speed of 8,000 r.p.m. where the wear was negligible, the performance was considered outstanding.

*Example II*

Tests were conducted to determine the coefficient of friction between various combinations of materials to demonstrate the superiority of the combinations of the present invention for bearing purposes. The materials tested were as follows:

Dense silicon carbide v. dense titanium carbide cermet
Dense alumina v. dense titanium carbide cermet
Dense alumina v. dense alumina
Dense silicon carbide v. dense silicon carbide
Dense silicon carbide v. dense alumina In conducting the tests a rod-like rider was pressed verticaly against a rotating disc under given load at various temperatures in the range from about 1000 to about 1400° F. and the coefficient of friction was determined by measuring the resistance imposed on the disc.

Results of the tests are tabulated below:

|  | Temp., °F. | Coefficient of Friction |
|---|---|---|
| 1. Silicon carbide rider on cermet flat | 1,200-1,400 | 0.5-0.4. |
| 2. Hot pressed alumina rider on cermet flat | 1,200-1,400 | 0.3-0.25. |
| 3. Hot pressed alumina on hot pressed alumina | 1,200-1,400 | 0.7-0.9. |
| 4. Silicon carbide rider on hot pressed alumina flat | 1,200-1,400 | 0.6-0.75. |
| 5. Silicon carbide on silicon carbide | 1,200-1,400 | 0.5-0.95. |

It is a surprising aspect of the tests that the coefficient of friction of the materials of the invention decrease with increasing temperatures; however, the materials tested for comparison including alumina on alumina, silicon carbide on silicon carbide, and silicon carbide on alumina produce increasing coefficients of friction with increasing temperatures.

*Example III*

A further series of tests was run to illustrate the effectiveness of refractory combinations of the invention for the production of high temperature-resistant bearings. This is called a 4-ball accelerated wear test wherein the balls are subjected to high temperatures and stresses to produce rapid wear. The tests were conducted by placing 3 balls in a titanium carbide cermet cup of a size just retaining the balls in triangular, horizontal array and imposing upon them a single ball which was in contact with each of the balls in the cup. A load was imposed on the upper ball and it was rotated at 10,000 r.p.m. by means of a chuck. No lubrication was used. Results are recorded below:

|  | Run A | Run B |
|---|---|---|
| Upper ball material | TiC cermet | TiC cermet. |
| Lower ball material | Hot pressed Al$_2$O$_3$ | Hot pressed SiC. |
| Test temperature | 1,300° F | 1,300° F. |
| Total load, kg | 1.7 | 1.7. |
| Calculated maximum contact stress, p.s.i.: | | |
| On upper ball | 275,000 | 275,000. |
| On cup base | 162,000 | 162,000. |
| Running time, minutes | 20 | 20. |
| Average width of wear track, mils.: | | |
| On upper ball | 21 | 61. |
| On cup base | 26 | 36. |

The foregoing results show that the amount of wear is low and that bearings made of these combinations of materials would still be operable after a substantial amount of severe use. Thus the combinations in accordance with the present invention displayed superior and unexpected resistance to wear at high temperatures.

For convenience in reference in the appended claims the rolling elements, i.e. the balls or rollers, whether or not provided with a spacer ring may be collectively designated the "rolling component" of the bearing and the raceways may be designated the "guiding component" of the bearing.

While the present invention has been described in connection with preferred embodiments thereof, it is subject to reasonable modifications as will become apparent to those skilled in the art and such modifications are to be included within the scope of the invention as defined by the appended claims.

I claim:

1. An anti-friction bearing of the rolling contact type comprising a plurality of rolling elements and a race-way, wherein said rolling elements are fabricated of alumina of a density of at least 95% of theoretical and said race-way is fabricated of titanium carbide cermet of a density of at least 95% of theoretical.

2. An anti-friction bearing of the rolling contact type comprising a plurality of rolling elements, a race-way

---

[1] Kennametal Corporation's K163B1 titanium carbide cermet containing about 55% titanium carbide, about 4.5% columbium carbide, about 0.5% tantalum carbide, 33.3% nickel and 6.7% molybdenum.

and a spacer, wherein said rolling elements are fabricated of alumina of a density of at least 95% of theoretical, said race-way is titanium carbide cermet of a density of at least 95% of theoretical, and said spacer is a high temperature resistant metal alloy.

3. A ball bearing consisting of balls of alumina and a race-way of titanium carbide cermet, said balls and race-way having a density of at least 95% of theoretical and a spacer ring of molybdenum-titanium alloy wherein molybdenum constitutes 99.5% by weight of said alloy and titanium constitutes the remainder.

4. An anti-friction bearing of the rolling contact type comprising a plurality of rolling elements, a race-way and a spacer wherein said rolling elements are fabricated of alumina of a density of at least 95% of theoretical, said race-way is titanium carbide cermet of a density of at least 95% of theoretical, and said spacer is a molybdenum-titanium alloy containing 99.5% by weight molybdenum and 0.5% by weight of titanium.

5. An anti-friction bearing of the rolling contact type comprising a rolling component and a guiding component, one of said components being formed of titanium carbide cermet and the other of said components being formed of a material selected from the group consisting of alumina and silicon carbide, the density of said components being at least 95% of theoretical.

6. An anti-friction bearing of the rolling contact type comprising a rolling component and a guiding component, one of said components being formed of titanium carbide cermet and the other of said components being formed of alumina, the density of said components being at least 95% of theoretical.

7. An anti-friction bearing of the rolling contact type comprising a rolling component and a guiding component, one of said components being formed of titanium carbide cermet and the other of said components being formed of silicon carbide, the density of said components being at least 95% of theoretical.

8. An anti-friction bearing as set forth in claim 5 in which said bearing comprises a spacer ring of a high temperature resistant alloy.

9. An anti-friction bearing as set forth in claim 8 in which said alloy is a molybdenum-titanium alloy.

References Cited in the file of this patent

UNITED STATES PATENTS

| | | |
|---|---|---|
| 2,648,573 | Wheildon | Aug. 11, 1953 |
| 2,685,545 | Sindeband | Aug. 3, 1954 |